United States Patent [19]

Suzuki et al.

[11] 4,408,311
[45] Oct. 4, 1983

[54] OPTICAL TRACKING APPARATUS

[75] Inventors: Junichi Suzuki, Kawasaki; Kenji Shintani, Tokyo, both of Japan

[73] Assignee: Sony Corporation, Tokyo, Japan

[21] Appl. No.: 261,514

[22] Filed: May 7, 1981

[30] Foreign Application Priority Data

May 16, 1980 [JP] Japan .............................. 55-67381[U]

[51] Int. Cl.$^3$ .......................... G11B 7/00; G11B 21/10
[52] U.S. Cl. ..................................... 369/43; 369/219; 369/222
[58] Field of Search ...................... 369/43, 44, 46, 33, 369/219, 220, 221, 222

[56] References Cited

U.S. PATENT DOCUMENTS

| 4,004,081 | 1/1977 | Zorn ......................................... 369/44 |
| 4,214,757 | 7/1980 | Kusaka et al. ........................... 369/43 |

Primary Examiner—Aristotelis M. Psitos
Assistant Examiner—Donald McElheny, Jr.

Attorney, Agent, or Firm—Lewis H. Eslinger; Alvin Sinderbrand

[57] ABSTRACT

An optical tracking apparatus for tracing a spiral track on a recording disk includes an optical pickup device having a semiconductor laser and a photoelectric conversion element; an arm device pivotally mounted to an arm shaft with the pickup device being mounted to the free end thereof to thereby move substantially along the radial direction of the recording disk; sectorial arm drive coil attached to a rear end portion of the arm device and having a current path loop in parallel with the rotational plane of the arm device; and a pair of stationary magnetic field forming devices, each formed of a respective yoke and permanent magnet assembly, the yokes having respective air gaps in which magnetic fields in opposite directions to each other are formed, the arm drive coil being arranged to move in the air gaps and being supplied with an arm drive signal and a tracking error correction signal for causing the pickup device to trace the track.

8 Claims, 9 Drawing Figures

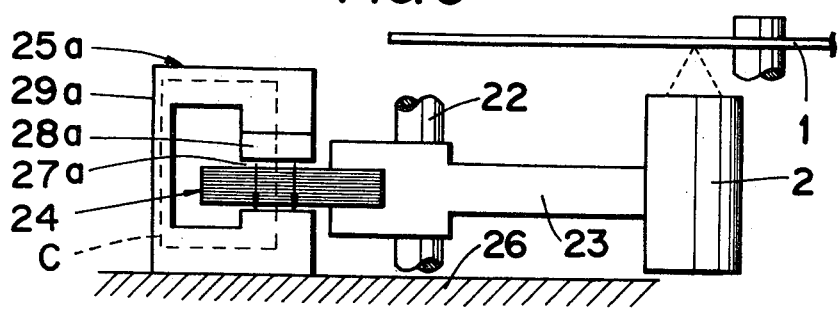
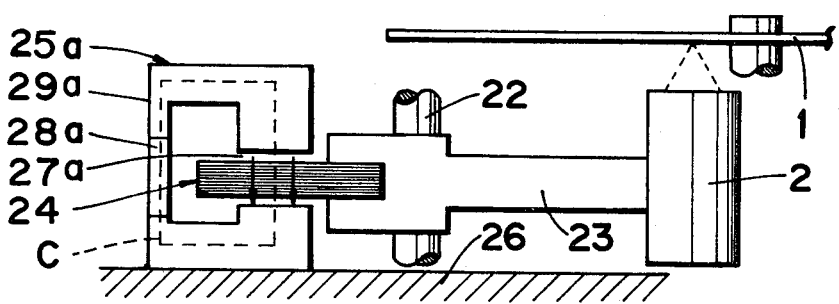
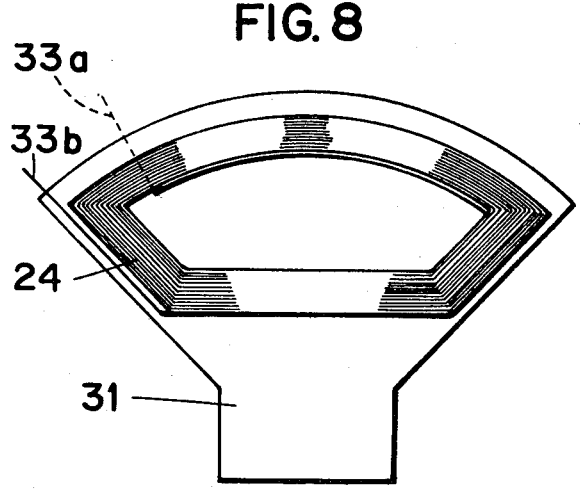
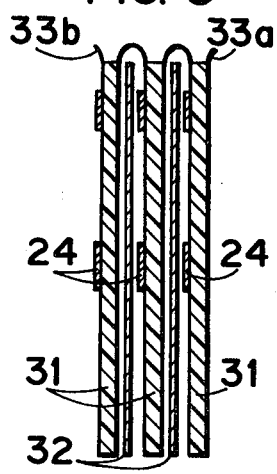

OPTICAL TRACKING APPARATUS

BACKGROUND OF THE INVENTION

1. Field of the Invention

This invention relates generally to an optical tracking apparatus for optically tracing a spiral track on a record disk, and more particularly, is directed to an optical tracking apparatus having particular utility in an audio PCM disk player, a video disk player or a video disk recorder.

2. Description of the Prior Art

Audio PCM information can be spirally recorded as numerous pits on a transparent disk by an optical audio PCM disk player, and then read out by an optical pickup device carried on an arm. An arm drive apparatus for a conventional player can be used for tracking with the pickup device. In the arm drive apparatus, the arm is supported at one end by an arm support which is rotatably supported by an arm shaft. Drive coils are fixed at both ends of the arm support and a magnetic field forming apparatus for interacting with the drive coils includes upper and lower ring yokes which are fixed to each other by a pair of permanent magnets. The drive coils are slidably fit on the upper ring yoke. Current flowing through the drive coils interacts with the magnetic field between the upper and lower ring yokes to generate an electromagnetic rotational torque for the arm.

In the above-described arm drive apparatus, the path for the magnetic field formed by the drive coils is constituted by the upper ring yoke which is a closed circuit. Accordingly, self-inductance of the drive coils is extremely so high as to deteriorate the frequency response characteristic of the tracking servo system due to the integration effect of the drive coils. In other words, the tracking servo system cannot follow tracking errors of high frequency. Further, iron loss of the upper ring yoke is large, and accordingly, the drive efficiency of the drive coils is low. The drive circuits of the servo system are therefore complicated and expensive.

SUMMARY OF THE INVENTION

Accordingly, it is an object of this invention to provide an optical tracking apparatus having a superior frequency response characteristic, although being simple in construction.

Another object of this invention is to provide an optical tracking apparatus in which iron loss is small.

A further object of this invention is to provide an optical tracking apparatus which is inexpensive.

In accordance with an aspect of this invention, an optical tracking apparatus for tracing at least one track on a recording disk includes optical pickup having light-emitting means and photoelectric conversion means; arm means pivotally mounted to an arm shaft so as to be adapted to rotate in a first plane and having a first end and a second end, the pickup means being mounted to the first end so as to be adapted to move substantially along the radial direction of the recording disk; arm drive coil means attached to the second end of the arm means and having a current path loop in parallel with the first rotational plane of the arm means; and stationary magnetic field forming means having at least one pair of air gaps in which magnetic fields in opposite directions to each other are formed, the arm drive coil means being arranged to move in the at least one pair of air gaps and supplied with an arm drive signal and a tracking error connection signal for cause the pickup means to trace the at least one track.

The above, and other, objects, advantages and features of the present invention will become readily apparent from the ensuing detailed description of illustrative embodiments thereof which are to be read in connection with the accompanying drawings.

BRIEF DESCRIPTION OF THE DRAWINGS

FIG. 6 is an elevational view of the optical tracking apparatus of FIG. 5, viewed along arrow VI thereof;

FIG. 7 is an elevational view of one modification of the apparatus of FIG. 6;

FIG. 8 is a top plan view of a printed board and coils in accordance with another modification of this invention; and FIG. 9 is a cross-sectional view of piled printed boards in accordance with another modification of this invention.

DETAILED DESCRIPTION OF THE PREFERRED EMBODIMENTS

In order to better understand this invention, a prior art arm drive apparatus for an optical audio PCM disk player will first be described with reference to FIGS. 1-4.

Figure 1:
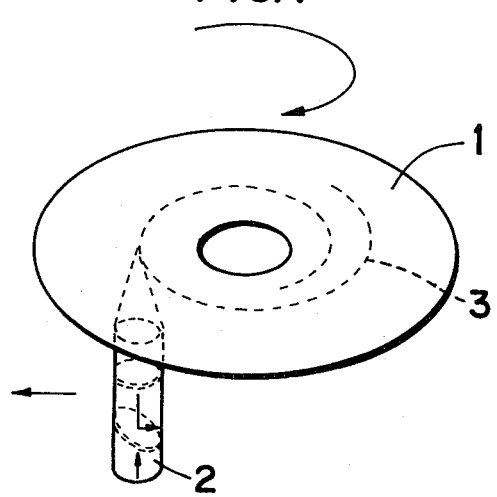
FIG. 1 is a schematic, perspective view of a portion of an optical audio PCM disk player with which this invention can be used.
Figure 2:
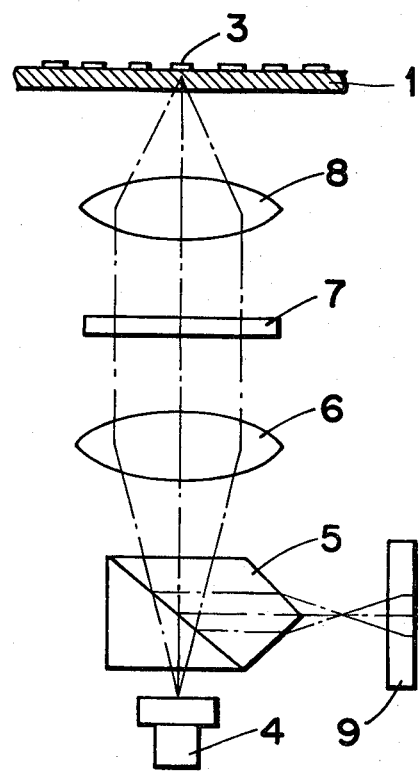
FIG. 2 is a schematic view of an optical system that can be employed in the pickup shown in FIG. 1.

Referring first to FIG. 1, audio PCM information is recorded on a transparent disk 1 in the form of pits 3 which are spirally formed on disk 1, with the spiral track starting from the center of disk 1. The audio PCM information is read out by a pickup 2, the optical system of which is schematically shown in FIG. 2. For example, a semiconductor laser 4 is used as a light source and light radiated from laser 4 is led to a collimator lens 6 through a beam splitter 5. Parallel light is obtained from collimator lens 6, and is led onto pits 3 through a λ/4 plate 7 and an objective lens 8. The reflected light from pits 3 passes through the same light path as the incident light, and is led to a photo detector 9 by beam splitter 5.

Figure 3:
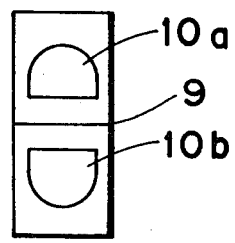
FIG. 3 is a schematic plan view of a photo detector that can be employed in the optical system shown in FIG. 2.

The existence of pits 3 causes the intensity of the electrical signal by photo detector 9 to vary. Pickup 2 is moved in the direction shown by the arrow in FIG. 1 in synchronization with the rotation of disk 3, whereby audio information is read out from disk 3. As shown in FIG. 3, photo detector 9 consists of photo detecting elements 10a and 10b arranged in the widthwise direction of the spiral track on disk 3. The ratio of the outputs of photo detecting elements 10a and 10b to each other represents the tracking error and the detected tracking error is fed to a tracking servo system for pickup 2.

Figure 4:
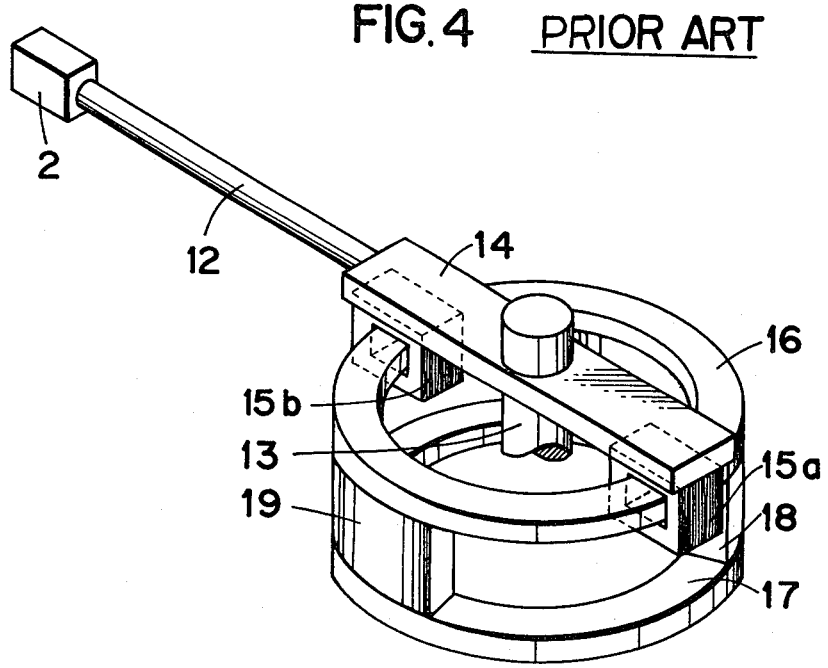
FIG. 4 is a perspective view of a prior art arm drive apparatus for an audio disk player which can be used as a tracking apparatus for an optical pickup.

FIG. 4 is a schematic perspective view of a prior art arm drive apparatus for a conventional player which can be used as a tracking apparatus for pickup 2. Referring to FIG. 4, pickup 2 is fixed to the upper free of an arm 12. With the rotation of arm 12, pickup 2 traces the spiral track on disk 1. Arm 12 is rotatably supported by a support plate 14 which is, in turn, supported by an arm shaft 13, such that arm 12 is rotated about arm shaft 13. Drive coils 15a and 15b are fixed on both ends of arm support 14. The drive motor for arm 12 is constituted by drive coils 15a and 15b, and a field forming apparatus fixed on a chassis (not shown).

The field forming apparatus consists of upper and lower ring yokes 16 and 17, and permanent magnets 18 and 19 connecting the upper and lower ring yokes 16 and 17. Drive coils 15a and 15b are slidably fit on upper ring yoke 16. Magnetic flux generated in the gap between upper and lower ring yokes 16 and 17 interacts with current flowing through drive coils 15a and 15b to impart electromagnetic rotational torque to arm 12.

A magnetic path for magnetic flux formed by drive coils 15a and 15b is constituted by upper ring yoke 16 which is a closed loop iron core. Accordingly, self-inductance of drive coils 15a and 15b is so high that the frequency response characteristic of the tracking servo system deteriorates due to the integration effect of coils 15a and 15b. When the apparatus of FIG. 4 is used with the disk player of FIG. 1, the tracking servo system cannot follow high frequency tracking errors caused by eccentricity of disk 1 and vibration of disk 1 and pickup 2 due to external forces, whereby the tracking characteristic of the system deteriorates. Further, iron loss of upper ring yoke 16 is large, resulting in a low drive efficiency of coils 15a and 15b is low. The drive circuit for the servo system is therefore complicated and expensive.

Figure 5:
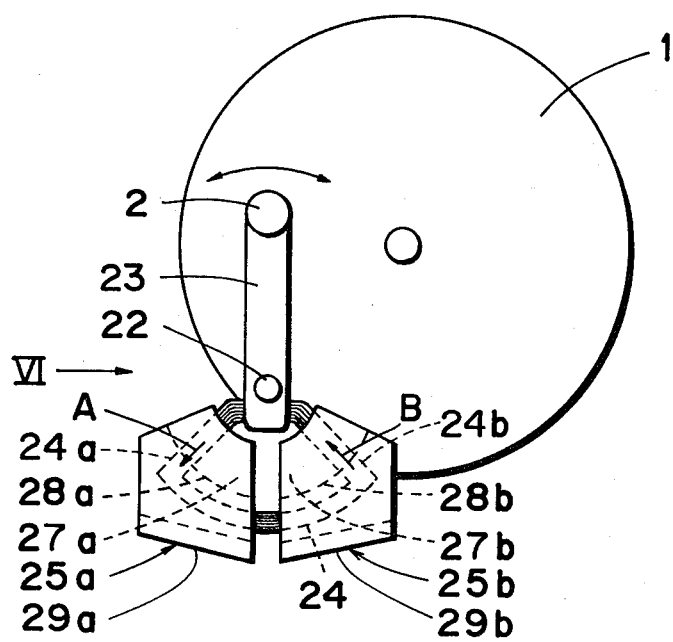
FIG. 5 is a bottom plan view of an optical tracking apparatus according to one embodiment of this invention.

Referring now to FIGS. 5 and 6, an optical tracking apparatus according to one embodiment of this invention, which cures the above-described defects of the prior art arm drive apparatus, will now be described.

As shown therein, pickup 2 is fixed to the top free end of an arm 23 which is rotatably supported by an arm shaft 22. A sectorial drive coil 24 is fixed on a rear end of arm 23 and two radial sides 24a and 24b of coil 24 function to generate rotational torque. Two field forming apparatus 25a and 25b are also fixed on a chassis (not shown) so as to face the two sides 24a and 24b of coil 24, respectively.

The field forming apparatus 25a and 25b are constituted by generally C-shaped yokes 29a and 29b, as shown in FIG. 6, and permanent magnets 28a and 28b fixed on yokes 29a and 29b, respectively. Yokes 29a and 29b include air gaps 27a and 27b, whereby magnetic flux flows in air gaps 27a and 27b, as shown by the arrows in FIG. 6. Air gap side surfaces of permanent magnets 28a and 28b facing sides 24a and 24b of coil 24 have N and S polarities in accordance with the directions of current flowing through sides 24a and 24b of coil 24 as shown by arrows A and B in FIG. 5, respectively. Sides 24a and 24b face toward arm shaft 22.

In this embodiment, magnetic flux formed by coil 24 flows through yokes 29a and 29b, and air gaps 27a and 27b, as shown by dotted line C in FIG. 6. Accordingly, the magnetic reluctance of the magnetic flux path of coil 24 is very high, and thereby, the self-inductance of coil 24 is very small. Thus, high frequency components of the current flowing through coil 24 are suppressed very little. The tracking apparatus can therefore follow tracking errors of high frequency with high fidelity. The tracking error correcting signal (AC) is added to the DC arm drive signal in coil 24. The amount of magnetic flux generated by coil 24 and flowing through yokes 29a and 29b is very small, and accordingly, iron loss of yokes 29a and 29b is not great, and the electromagnetic conversion efficiency of coil 24 is high. The coil drive circuit can therefore be simplified and becomes inexpensive.

Referring now to FIG. 7, there is shown a modification of the above embodiment of FIGS. 5 and 6. In particular, permanent magnets 28a and 28b are embedded in yokes 29a and 29b and do not face 24, which may be formed in a manner such that wire is wound on a sectorial bobbin. In particular, each yoke is comprised of two yoke members, an upper member having an upper pole face and a lower member having a lower pole face, with the permanent magnets connecting the two yoke members of each yoke.

Referring now to FIG. 8 and FIG. 9, there is shown another modification of the above described embodiments. In this modification, sectorial coils 24 are printed on boards 31 and the printed boards 31 and insulating films 32 are alternately piled, as shown in FIG. 9. Initial ends 33a and terminal ends 33b are led out from coils 24, and connected to each other, respectively.

Having described illustrative embodiments of the invention in detail herein with reference to the accompanying drawings, it is to be understood that the invention is not limited to the precise embodiments, and that various changes and modifications can be effected therein by one skilled in the art without departing from the scope and spirit of the invention as defined in the appended claims.

What is claimed is:

1. An optical tracking apparatus for tracing at least one track on a recording disk to reproduce an information signal recorded in said at least one track, comprising:

optical pickup means having light-emitting means for projecting a light beam onto said recording disk to modulate said light beam with said information signal and photoelectric conversion means for producing said information signal in response to said modulated light beam;

arm means pivotally mounted to an arm shaft so as to be adapted to rotate in a first plane and having a first and a second end, said pickup means being mounted to said first end so as to be adapted to move substantially along the radial direction of said recording disk;

arm drive coil means attached to said second end of said arm means and having a current path loop in parallel with the first rotational plane of said arm means;

means for producing an arm drive signal;

means for producing a tracking error correction signal in response to said modulated light beam; and stationary magnetic field forming means having at least one pair of air gaps in which magnetic fields in opposite directions to each other are formed, said arm drive coil means being arranged to move in said at least one pair of air gaps and being supplied with said arm drive signal and said tracking error correction signal for causing said pickup means to trace at least one track.

2. An optical tracking apparatus according to claim 1, in which said arm drive coil means is in the form of a sector including a pair of radial side portions arranged in said at least one pair of air gaps.

3. An optical tracking apparatus according to claim 2, in which said pair of radial side portions face toward said arm shaft.

4. An optical tracking apparatus according to claim 1, in which said magnetic field forming means has magnetic flux path loops interlinked with the current path loop of said arm drive coil means, and said magnetic flux path loops include said at least one pair of air gaps.

5. An optical tracking apparatus according to claim 1, in which said magnetic field forming means includes at least one yoke of a generally C-shaped cross section and at least one permanent magnet fixed to said at least one yoke, said at least one permanent magnet facing said arm drive coil means.

6. An optical tracking apparatus according to claim 1, in which said magnetic field forming means includes two yoke members and a permanent magnet connecting said two yoke members, said arm drive coil means being arranged between pole faces of said two yoke members.

7. An optical tracking apparatus according to claim 2, in which said arm drive coil means includes plural piled printed boards separating a plurality of drive coils.

8. An optical tracking apparatus according to claim 1, in which said light-emitting means includes a semi-conductor laser.

* * * * *

Disclaimer 4,408,311.—*Junichi Suzuki*, Kawasaki; and *Kenji Shintani*, Tokyo, Japan. OPTICAL TRACKING APPARATUS. Patent dated Oct. 4, 1983. Disclaimer filed Nov. 1, 1984, by the assignee, *Sony Corp.*

Hereby enters this disclaimer to all claims of said patent.
[*Official Gazette March 12, 1985.*]